United States Patent
Fujita et al.

(10) Patent No.: US 12,043,706 B2
(45) Date of Patent: Jul. 23, 2024

(54) MONODISPERSE HYDROGEL PARTICLES

(71) Applicant: KURARAY CO., LTD., Okayama (JP)

(72) Inventors: Akio Fujita, Ibaraki (JP); Atsushi Inatomi, Ibaraki (JP); Kenta Toshinari, Ibaraki (JP); Goro Kobayashi, Tokyo (JP)

(73) Assignee: KURARAY CO., LTD., Okayama (JP)

( * ) Notice: Subject to any disclaimer, the term of this patent is extended or adjusted under 35 U.S.C. 154(b) by 256 days.

(21) Appl. No.: 17/295,537

(22) PCT Filed: Nov. 21, 2019

(86) PCT No.: PCT/JP2019/045655
§ 371 (c)(1),
(2) Date: May 20, 2021

(87) PCT Pub. No.: WO2020/105708
PCT Pub. Date: May 28, 2020

(65) Prior Publication Data
US 2022/0017703 A1    Jan. 20, 2022

(30) Foreign Application Priority Data
Nov. 21, 2018  (JP) ................ 2018-218610

(51) Int. Cl.
*C08J 3/075*  (2006.01)
*C08F 16/06*  (2006.01)
*C08J 3/12*  (2006.01)
*C08J 3/24*  (2006.01)

(52) U.S. Cl.
CPC .............. *C08J 3/075* (2013.01); *C08F 16/06* (2013.01); *C08J 3/12* (2013.01); *C08J 3/24* (2013.01)

(58) Field of Classification Search
CPC ........ C08J 3/075; C08F 16/06; C08F 2810/20
See application file for complete search history.

(56) References Cited

U.S. PATENT DOCUMENTS

| | | | |
|---|---|---|---|
| 2001/0036451 A1* | 11/2001 | Goupil | A61B 17/12022 525/61 |
| 2001/0051670 A1 | 12/2001 | Goupil et al. | |
| 2001/0056301 A1 | 12/2001 | Goupil et al. | |
| 2016/0015862 A1* | 1/2016 | Ahlering | A61L 29/14 604/103.02 |
| 2018/0243442 A1 | 8/2018 | Lam et al. | |

FOREIGN PATENT DOCUMENTS

| | | |
|---|---|---|
| JP | H10-152511 A | 6/1998 |
| JP | H10-210969 A | 8/1998 |
| JP | H10-513408 A | 12/1998 |
| JP | 2001-89574 A | 4/2001 |
| JP | 2002-506813 A | 3/2002 |
| JP | 2002-527206 A | 8/2002 |
| JP | 2003-527173 A | 9/2003 |
| JP | 2014-12851 A | 1/2014 |
| JP | 2019-35043 A | 3/2019 |

OTHER PUBLICATIONS

Definition of Ether, Hawley's Condensed Chemical Dicationary (2007) (Year: 2007).*
ISR for PCT/JP2019/045655, dated Feb. 4, 2020.
Kumar et al., "Crosslinked chitosan/polyvinyl alcohol blend beads for removal and recovery of Cd(II) from wastewater", Journal of Hazardous Materials, 2009, 172:1041-1048.
Akgöl et al., "Hydrolysis of sucrose by invertase immobilized onto novel magnetic polyvinlalcohol microspheres", Food Chemistry, 2001, 74:281-288.
Fundueanu et al., "Poly(vinyl alcohol) microspheres with pH- and thermosensitive properties as temperature-controlled drug delivery", Acta Biomaterialia, 2010, 6:3899-3907.
Müller-Schulte et al., "Novel magnetic microspheres on the basis of poly(vinyl alcohol) as affinity medium for quantitative detection of glycated haemoglobin", Journal of Chromatography A, 1995, 711:53-60.
Ting et al., "Use of polyvinyl alcohol as a cell immobilization matrix for copper biosorption by yeast cells", Journal of Chemical Technology and Biotechnology, 2000, 75:541-546.
Young et al., "Poly(vinyl alcohol)-heparin biosynthetic microspheres produced by microfluidics and ultraviolet photopolymerisation", Biomicrofluidics, 2013, 7:044109 (13 pages).
EESR issued in EP Patent Application No. 19887055.2, Jun. 29, 2022.
Ishizu et al., "Microsphere synthesis by emulsion copolymerization of methyl methacrylate with binary macromonomer blends", *Polymer* vol. 37 No. 9, pp. 1729-1734, Apr. 1, 1996, XP000584376.

* cited by examiner

*Primary Examiner* — Robert C Boyle
(74) *Attorney, Agent, or Firm* — GREENBLUM & BERNSTEIN, P.L.C.

(57) ABSTRACT

The present invention relates to monodisperse hydrogel particles containing a cross-linked product of a vinyl alcohol-based polymer having an ethylenically unsaturated group and an average degree of polymerization of 450 or more, the monodisperse hydrogel particles having an average particle size of 10 to 5,000 μm, and a coefficient of variation of a particle size distribution of 10% or less.

13 Claims, No Drawings

MONODISPERSE HYDROGEL PARTICLES

TECHNICAL FIELD

The present invention relates to high-strength monodisperse hydrogel particles containing a cross-linked product of a vinyl alcohol-based polymer that has an ethylenically unsaturated group, and a composite using the same.

BACKGROUND ART

Polyvinyl alcohol (hereinafter, also abbreviated as "PVA") is a water-soluble synthetic polymer having features such as excellence in hydrophilicity reactivity biodegradability biocompatibility low toxicity and the like, and forms gel with high flexibility and strength through cross-linking. In regard to gel particles obtained through cross-linking of PVA (hereinafter, also abbreviated as "PVA gel particles"), a variety of applications such as an adsorption carrier of metal ions or the like (e.g., Non-Patent Document 1), an enzyme immobilization carrier (e.g., Non-Patent Document 2), a drug delivery carrier (e.g., Non-Patent Document 3), an affinity carrier (e.g., Non-Patent Document 4), an encapsulation carrier of cells or microorganisms (e.g., Non-Patent Document 5), particles for vascular embolization (e.g., patent document 1), and a carrier for drainage treatment (e.g., patent document 2), have been suggested.

When the gel particles are used for these purposes, for the purpose of preventing disintegration during use, the PVA gel particles need to have a high mechanical strength. In addition, from the viewpoint of controlling the surface area of gel particles or the diffusion of substances into the inside, and also reducing the pressure loss during filtration, it is desirable that the particle size distribution of gel particles is narrow.

In order to obtain gel through cross-linking of PVA, a cross-linking method using, for example, a cross-linking agent containing two or more aldehyde groups (glutaraldehyde or the like) has conventionally been known. However, in recent years, as a cross-linking method more efficient than that of glutaraldehyde, PVA macromers having a polymerizable group in a pendant have also been suggested (patent documents 3 and 4). The PVA macromers have a stimulation curability in which curing is rapidly performed by stimulation such as light or heat.

As a method of producing gel particles by using these PVA macromers, patent document 5 discloses a method in which an aqueous solution of PVA macromers is suspended in an organic solvent such as paraffin, and is polymerized so as to produce PVA gel particles. In addition, Non-Patent Document 6 suggests production of PVA gel particles with a narrow particle size distribution, in which an aqueous solution of PVA macromers is formed into a spherical shape by using a microfluidic technique, and is cured.

CITATION LIST

Patent Literature

PTL 1: JP 2002-527206 A
PTL 2: JP 2001-089574 A
PTL 3: JP 10-513408 A
PTL 4: JP 2002-506813 A
PTL 5: JP 2014-012851 A

Non-Patent Literature

NPTL 1: Journal of Hazardous Materials, 2009, Vol. 172, p. 1041 to 1048
NPTL 2: Food Chemistry, 2001, Vol. 74, p. 281 to 288
NPTL 3: Acta Biomaterialia, 2010, Vol. 6, p. 3899 to 3907
NPTL 4: Journal of Chromatography A, 1995, Vol. 711, p. 53 to 60
NPTL 5: Journal of Chemical Technology and Biotechnology 2000, Vol. 75, p. 541 to 546
NPTL 6: Biomicrofluidics, 2013, Vol. 7, p. 044109

SUMMARY OF INVENTION

Technical Problem

In regard to the PVA gel particles described in patent document 5, it is possible to use PVA macromers having a high molecular weight, and it is also possible to produce PVA gel particles having a relatively high gel strength, but since the production is carried out by suspension polymerization, there is also a problem in that the particle size distribution is likely to be wide, and many agglomerates of particles are also generated. In addition to the above problems, the suspension polymerization requires a classification process using a sieve in order to obtain PVA gel particles having a desired particle size. In this case, PVA gel particles having a particle size unsuitable for a purpose have to be discarded, and thus the process becomes very inefficient. In addition, in the filter separation of PVA gel particles, the possibility that PVA gel particles having a small particle size may be mixed into the filtrate side cannot be denied, and thus a filter with a small pore size is essential depending on applications. In this case, there is a problem in that the pressure loss becomes too large in the filtration process.

Meanwhile, when the microfluidic technique described in Non-Patent Document 6 is used, it is possible to produce PVA gel particles with a narrow particle size distribution. However, the method disclosed in Non-Patent Document 6 has a problem in that since the molecular weight of PVA macromers is too small, the obtained PVA gel particles have a very low mechanical strength, and cannot be used for practical purposes. Further, wrinkles appear on the surface of the produced particles, and the smoothness is very low, and thus this method also has a problem in that many agglomerates of particles are generated.

The present invention has been made in view of the above conventional problems, and an object thereof is to provide monodisperse hydrogel particles having a high mechanical strength and a narrow particle size distribution, and a composite using the same.

Solution to Problem

As a result of intensive studies, the present inventors, etc. have found that when particles are formed by cross-linking a vinyl alcohol-based polymer that has an ethylenically unsaturated group and a specific degree of polymerization, it is possible to obtain monodisperse hydrogel particles with a specific average particle size, and then have completed the present invention.

That is, the present invention relates to the followings [1] to [8].

[1] Monodisperse hydrogel particles containing a cross-linked product of a vinyl alcohol-based polymer having an ethylenically unsaturated group and an average degree of polymerization of 450 or more, the monodisperse hydrogel particles having an average particle size of 10 to 5,000 μm, and a coefficient of variation of a particle size distribution of 10% or less.

[2] In the monodisperse hydrogel particles described in [1], the cross-linked product of the vinyl alcohol-based polymer has a tensile breaking strength of 0.05 MPa or more.

[3] In the monodisperse hydrogel particles described in [1] or [2], the ethylenically unsaturated group is at least one selected from the group consisting of a vinyl group, a (meth)acryloyloxy group, a (meth)acryloylamino group, a vinylphenyl group, a norbornenyl group and derivatives thereof.

[4] In the monodisperse hydrogel particles described in any one of [1] to [3], an introduction rate of the ethylenically unsaturated group is 0.01 to 10 mol % relative to all structural units constituting the vinyl alcohol-based polymer.

[5] In the monodisperse hydrogel particles described in any one of [1] to [4], the hydrogel particles contain a solvent of 5 to 99% by mass.

[6] A composite of the monodisperse hydrogel particles described in any one of [1] to [5], and a physiologically active substance or an enzyme.

[7] In the composite described in [6], the monodisperse hydrogel particles are covalently bonded to the physiologically active substance or the enzyme.

[8] A method of producing monodisperse hydrogel particles containing a cross-linked product of a vinyl alcohol-based polymer having an ethylenically unsaturated group and an average degree of polymerization of 450 or more, in which an average particle size is 10 to 5,000 μm, the method including the following steps 1 to 3:

step 1: step of preparing an uncured gel solution containing the vinyl alcohol-based polymer;

step 2: step of forming the uncured gel solution obtained in step 1, into particles by using a suspension polymerization method, a membrane emulsification method, a microfluid method or a nozzle extrusion method; and step 3: step of cross-linking the vinyl alcohol-based polymer in the particles obtained in step 2

Advantageous Effects of Invention

According to the present invention, it is possible to provide monodisperse hydrogel particles having a high mechanical strength and a narrow particle size distribution, and a composite using the same.

DESCRIPTION OF EMBODIMENTS

Hereinafter, the present invention will be described in detail.

In the present specification, "(meth)acryl" means a general term of "methacryl" and "acryl", and "(meth)acryloyl" means a general term of "methacryloyl" and "acryloyl."

[Monodisperse Hydrogel Particles]

Monodisperse hydrogel particles of the present invention are monodisperse hydrogel particles containing a cross-linked product of a vinyl alcohol-based polymer having an ethylenically unsaturated group and an average degree of polymerization of 450 or more, and are monodisperse hydrogel particles (hereinafter, also simply referred to as "hydrogel particles") in which the average particle size is 10 to 5,000 μm, and the coefficient of variation of a particle size distribution is 10% or less.

According to the present invention, since the vinyl alcohol-based polymer having an ethylenically unsaturated group and an average degree of polymerization of 450 or more is used, the mechanical strength of the hydrogel particles is high. In addition, since the average particle size is 10 to 5,000 μm, and the coefficient of variation of a particle size distribution is 10% or less, the monodisperse hydrogel particles have a high filterability, and thus may be used in a wide range of applications.

The coefficient of variation of the hydrogel particles of the present invention is on a logarithmic scale, and may be measured by a method to be described below.

<Vinyl Alcohol-Based Polymer Having Ethylenically Unsaturated Group and Average Degree of Polymerization of 450 or More>

The monodisperse hydrogel particles of the present invention contain a cross-linked product of a vinyl alcohol-based polymer having an ethylenically unsaturated group and an average degree of polymerization of 450 or more (hereinafter, also simply referred to as a "vinyl alcohol-based polymer"), and more specifically, has a cross-linked structure in which PVA chains as a raw material are cross-linked with each other by structural units derived from ethylenically unsaturated groups.

The vinyl alcohol-based polymer used in the present invention is not particularly limited as long as it has an ethylenically unsaturated group, an average degree of polymerization is 450 or more, and the content of vinyl alcohol-derived structural units in the polymer is greater than 50 mol %, and may contain vinyl ester-derived structural units. The total amount of vinyl alcohol-derived structural units and vinyl ester-derived structural units relative to all structural units constituting the vinyl alcohol-based polymer is preferably 80 mol % or more, more preferably 90 mol % or more, further preferably 95 mol % or more.

The ethylenically unsaturated group is not particularly limited and may be freely selected, but is preferably a group capable of forming a cross-link between vinyl alcohol-based polymer chains by an active energy ray, heat, a redox-based polymerization initiator or the like to be described below. It is more preferable to use a radically polymerizable group as the ethylenically unsaturated group, and examples thereof include cyclic unsaturated hydrocarbon groups such as a vinyl group, a (meth)acryloyloxy group, a (meth)acryloylamino group, a vinylphenyl group, a cyclohexenyl group, a cyclopentenyl group, a norbornenyl group, and a dicyclopentenyl group, and derivatives thereof. These ethylenically unsaturated groups may be present on either a side chain or a terminal of a vinyl alcohol-based polymer chain.

The "vinyl group" in the present invention includes not only an ethenyl group, but also a chain unsaturated hydrocarbon group such as an allyl group or an alkenyl group, a vinyloxycarbonyl group and the like.

Among the radically polymerizable groups, from the viewpoint of improving the mechanical strength of the hydrogel particles, at least one selected from the group consisting of a vinyl group, a (meth)acryloyloxy group, a (meth)acryloylamino group, a vinylphenyl group, a norbornenyl group, and derivatives thereof is preferable. In addition, from the viewpoint of reactivity, a functional group having a terminal unsaturated carbon bond is preferable, and a (meth)acryloyloxy group is more preferable.

The average degree of polymerization of the vinyl alcohol-based polymer is required to be 450 or more from the viewpoint of suppressing the embrittlement of the hydrogel particles of the present invention. This is because when the average degree of polymerization is less than 450, the mechanical strength of the hydrogel particles is reduced, and when the average degree of polymerization is 450 or more, a good mechanical strength is exhibited. From this viewpoint, the average degree of polymerization of the vinyl alcohol-based polymer is preferably 500 or more, and may be 1,000 or more, or may be 1,500 or more. Then, it is preferably 10,000 or less, more preferably 5,000 or less, further preferably 3,000 or less, still more preferably 2,500 or less from the viewpoint of suppressing a viscosity increase of an uncured gel solution to be described below, and improving the processability. A desirable range of the average degree of polymerization is 450 to 10,000, more preferably 450 to 5,000, further preferably 500 to 3,000, most preferably 500 to 2,500. As for the vinyl alcohol-based polymer, two or more types having different average degrees of polymerization may be mixed and used.

The average degree of polymerization of the vinyl alcohol-based polymer in the present specification refers to the average degree of polymerization measured in accordance with JIS K 6726:1994. Specifically the degree of polymerization of the vinyl alcohol-based polymer can be regarded as being the same as that of PVA as a raw material to be described below, and thus, can be obtained from the extreme viscosity measured in water of 30° C. after purification of the PVA as the raw material.

In many cases, a shearing force or a pressure is applied to the hydrogel particles in the practical use. Thus, when the mechanical strength of hydrogel contained in the particles is too low, the particles are disintegrated. The disintegration of the particles causes contamination of debris into a product, clogging or the like.

In the prior art such as Non-Patent Document 6, PVA having an average degree of polymerization of about 400 has been used because the viscosity of an aqueous solution is low and handling is easy. It is also possible to obtain hydrogel by introducing an ethylenically unsaturated group into the PVA and performing curing by a radical initiator. However, through studies, the present inventors etc. concluded that this has difficulty in the practical use, because it has been found that disintegration relatively easily occurs due to a shearing force, and the surface smoothness of produced particles is low (surface roughness is remarkable). However, in the present invention, it has been surprisingly found that when PVA having a slightly high degree of polymerization (an average degree of polymerization of 450 or more) is used, the mechanical strength of hydrogel formed from the PVA having an ethylenically unsaturated group is dramatically increased, and the surface smoothness of produced particles is largely increased.

It is not clear why the mechanical strength of the hydrogel or the surface smoothness of the particles is largely increased when the PVA having an average degree of polymerization of 450 or more is used as described above. However, it may be thought that when the average degree of polymerization of the PVA is less than 450, the entanglement between PVAs in water or the number of ethylenically unsaturated groups introduced per molecular chain of the PVA is too small, and thus a sufficient gel network is not formed only through limited cross-linking by the ethylenically unsaturated groups. It may be thought that this definitely affects the mechanical strength of hydrogel, and the high mechanical strength results in prevention of the surface roughness during the process of particle production.

<Method of Producing Vinyl Alcohol-Based Polymer>

Examples of a method of producing the vinyl alcohol-based polymer used in the present invention, that is, the vinyl alcohol-based polymer having an ethylenically unsaturated group and an average degree of polymerization of 450 or more, include a method of introducing an ethylenically unsaturated group through a side chain, a terminal functional group, or the like of polyvinyl alcohol as a raw material (hereinafter, also abbreviated as "raw material PVA"), and a method in which in the production process of a raw material PVA, a vinyl ester-based monomer is copolymerized with a monomer having a reactive substituent other than a hydroxy group, as a polymerizable monomer other than the vinyl ester-based monomer, and then the reactive substituent within the copolymer is allowed to react with a compound having an ethylenically unsaturated group so as to introduce the ethylenically unsaturated group.

The raw material PVA may be produced by saponifying polyvinyl ester obtained by polymerizing a vinyl ester-based monomer, and converting an ester group in the polyvinyl ester into a hydroxy group.

Examples of the vinyl ester-based monomer include aliphatic vinyl esters such as vinyl formate, vinyl acetate, vinyl propionate, n-vinyl butyrate, vinyl isobutyrate, vinyl pivalate, versatic acid vinyl, vinyl caproate, caprylic acid vinyl, vinyl caprate, vinyl laurate, vinyl myristate, vinyl palmitate, vinyl stearate, and vinyl oleate; and aromatic vinyl esters such as vinyl benzoate. One of the vinyl ester-based monomers may be used alone or two or more thereof may be used in combination.

Among the vinyl ester-based monomers, aliphatic vinyl ester is preferable, and from the viewpoint of a production cost, vinyl acetate is more preferable. That is, it is desirable that the polyvinyl ester is polyvinyl acetate obtained by polymerizing vinyl acetate.

In addition, as necessary the polyvinyl ester may contain a structural unit derived from a monomer other than the vinyl ester-based monomer as long as the effect of the present invention is not impaired. Examples of the other monomer include α-olefins such as ethylene, propylene, n-butene, and isobutylene; acrylic acid or its salts; acrylic acid alkyl esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid or its salts; methacrylic acid alkyl esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives such as acrylamide, N-methylacrylamide, N-ethylacrylamide, N,N-dimethylacrylamide, diacetoneacrylamide, acrylamidepropanesulfonic acid or salts thereof, acrylamidepropyldimethylamine or its salts or quaternary salts, and N-methylolacrylamide or its derivatives; methacrylamide derivatives such as methacrylamide, N-methylmethacrylamide, N-ethylmethacrylamide, methacrylamidepropanesulfonic acid or salts thereof, methacrylamidepropyldimethylamine or its salts or quaternary salts, and N-methylolmethacrylamide or its derivatives; N-vinylamide derivatives such as N-vinylformamide and N-vinylacetamide; vinylethers such as methylvinylether, ethylvinylether, n-propylvinylether, i-propylvinylether, n-butylvinylether, i-butylvinylether, t-butylvinylether, dodecylvinylether, and stearylvinylether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; maleic acid or its salts, esters or acid anhydrides; vinyl silyl compounds such as vinyltrimethoxysilane; and isopropenyl acetate. One of the other monomers may be used alone or two or more thereof may be used in combination.

When the polyvinyl ester contains a structural unit derived from another monomer, the content of structural units derived from another monomer is preferably 20 mol % or less relative to all structural units constituting the polyvinyl ester, more preferably 10 mol % or less, further preferably 5 mol % or less.

A method of saponifying the polyvinyl ester is not particularly limited, but the same method as that in the related art may be performed. For example, an alcohol decomposition method using an alkali catalyst or an acid catalyst, a hydrolysis method and the like may be applied. Among them, a saponification reaction using methanol as a solvent and a caustic soda (NaOH) catalyst is preferable due to its simplicity.

The average degree of polymerization of the raw material PVA is 450 or more, and a specific suitable range is the same as the average degree of polymerization of the vinyl alcohol-based polymer.

As described above, the average degree of polymerization of the raw material PVA in the present specification refers to the average degree of polymerization measured in accordance with JIS K 6726:1994, and specifically can be obtained from the extreme viscosity measured in water of 30° C. after the raw material PVA is saponified and purified.

The saponification degree of the raw material PVA is preferably 50 mol % or more, more preferably 60 mol % or more, further preferably 65 mol % or more from the viewpoint of improving the water-solubility of the raw material PVA.

In addition, from the viewpoint of suppressing a viscosity increase of an uncured gel solution to be described below, and improving the storage stability of the uncured gel solution, the saponification degree of the raw material PVA is preferably 99 mol % or less.

In the present specification, the saponification degree of the raw material PVA means an occupying ratio (mol %) of the number of moles of vinyl alcohol units to the total number of moles of the vinyl alcohol units and structural units (e.g., vinyl acetate units) convertible into vinyl alcohol units through saponification in the raw material PVA, and may be measured in accordance with JIS K 6726:1994.

The viscosity of 4% by mass of the raw material PVA at 20° C. is preferably 0.5 to 100 mPa·s, more preferably 1 to 80 mPa·s, further preferably 2 to 60 mPa·s. When the viscosity falls within the range, the easiness of production of hydrogel particles is improved, and the strength of the hydrogel particles can be improved.

The viscosity in the present specification refers to a viscosity at a temperature of 20° C. when a B type viscometer (rotation speed: 12 rpm) is used for an aqueous solution of 4% by mass of the raw material PVA in accordance with a rotary viscometer method of JIS K 6726:1994.

The introduction of the ethylenically unsaturated group into the raw material PVA is preferably performed through a side chain, a terminal functional group, or the like of the raw material PVA. It is more preferable that a hydroxy group in the side chain of the raw material PVA is allowed to react with a compound containing an ethylenically unsaturated group (hereinafter, also abbreviated as an "ethylenically unsaturated group-containing compound").

Examples of the ethylenically unsaturated group-containing compound reacting with the hydroxy group in the side chain of the raw material PVA include (meth)acrylic acids such as (meth)acrylic acid, (meth)acrylic acid anhydride, (meth)acrylic acid halide, and (meth)acrylic acid ester or derivatives thereof, and these compounds may be subjected to an esterification reaction or a transesterification reaction in the presence of a base so as to introduce a (meth)acryloyl group.

In addition, examples of the ethylenically unsaturated group-containing compound reacting with the hydroxy group in the side chain of the raw material PVA include a compound containing an ethylenically unsaturated group and a glycidyl group in a molecule, for example, glycidyl (meth)acrylate, and allyl glycidyl ether. These compounds may be subjected to an etherification reaction in the presence of a base so as to introduce a (meth)acryloyl group or an allyl group into the raw material PVA.

In addition, examples of the ethylenically unsaturated group-containing compound reacting with a 1,3-diol group of the raw material PVA include a compound containing an ethylenically unsaturated group and an aldehyde group in a molecule, such as acrylaldehyde (acrolein), methacrylaldehyde (methacrolein), 5-norbornene-2-carboxyaldehyde, 7-octenal, 3-vinylbenzaldehyde, or 4-vinylbenzaldehyde. These compounds may be subjected to an acetalizing reaction in the presence of an acid catalyst so as to introduce an ethylenically unsaturated group into the raw material PVA. More specifically for example, 5-norbornene-2-carboxyaldehyde, 3-vinylbenzaldehyde, 4-vinylbenzaldehyde or the like may be subjected to an acetalizing reaction so as to introduce a norbornenyl group or a vinylphenyl group into the raw material PVA. In addition, through a reaction of N-(2,2-dimethoxyethyl)(meth)acrylamide or the like, it is possible to introduce a (meth)acryloylamino group into the raw material PVA.

As a method of introducing an ethylenically unsaturated group into the raw material PVA, those other than the exemplified reaction may be used, and two or more reactions may be used in combination.

Besides, as for the introduction method of the ethylenically unsaturated group, a method may be exemplified in which in the production process of the raw material PVA, a vinyl ester-based monomer is copolymerized with a monomer having a reactive substituent other than a hydroxy group, as a polymerizable monomer other than the vinyl ester-based monomer, and is saponified so as to obtain copolymerized-modified polyvinyl alcohol (hereinafter, also abbreviated as "copolymerized-modified PVA"), and then the reactive substituent such as a carboxy group present in the copolymerized-modified PVA or an amino group present in the copolymerized-modified PVA is allowed to react with the ethylenically unsaturated group-containing compound. The copolymerized-modified PVA having a carboxy group may be referred to as "carboxylic acid-modified PVA," and the copolymer having an amino group may be referred to as "amino-modified PVA" in some cases.

Examples of a monomer constituting the carboxylic acid-modified PVA include α,β-unsaturated carboxylic acids such as (meth)acrylic acid, maleic acid, fumaric acid, and itaconic acid; (meth)acrylic acid alkyl esters such as methyl (meth)acrylate, and ethyl (meth)acrylate; α,β-unsaturated carboxylic acid anhydrides such as maleic anhydride, and itaconic anhydride, and derivatives thereof. In the carboxylic acid-modified PVA, for example, a vinyl ester-based monomer is copolymerized with α,β-unsaturated carboxylic acid anhydride or the like or its derivative, and is saponified, and then the introduced carboxy group is allowed to react with, for example, glycidyl methacrylate under an acidic condition, so that an ester bond is generated and a methacryloyl group can be introduced.

In addition, in the amino-modified PVA, a vinyl ester-based monomer is copolymerized with N-vinylformamide or the like, and is saponified, and then the introduced amino group is subjected to an amidation reaction with, for example, acrylic acid anhydride in the presence of a base so as to introduce an acryloylamino group. In addition, the amino group of the amino-modified PVA may be subjected to an amidation reaction with, for example, divinyl adipate so as to introduce a vinyloxycarbonyl group. As a method of introducing an ethylenically unsaturated group through the copolymerized-modified PVA, those other than the exemplified reaction may be used, or two or more reactions may be used in combination.

The vinyl alcohol-based polymer having an ethylenically unsaturated group is preferably a vinyl alcohol-based polymer in which an ethylenically unsaturated group is introduced via a hydroxy group in the side chain of the raw material PVA, such as a 1,3-diol group, from the viewpoint of easiness of production, more preferably a vinyl alcohol-based polymer in which (meth)acrylic acid or its derivative is subjected to an esterification reaction or a transesterification reaction with a hydroxy group in the side chain of the raw material PVA, or a vinyl alcohol-based polymer in which a compound containing an ethylenically unsaturated group and an aldehyde group in the molecule is subjected to an acetalizing reaction with a 1,3-diol group of the raw material PVA.

[Introduction Rate of Ethylenically Unsaturated Group]

The introduction rate of an ethylenically unsaturated group is preferably 10 mol % or less, more preferably 5 mol % or less, further preferably 3 mol % or less relative to all structural units constituting the vinyl alcohol-based polymer from the viewpoint of suppressing the embrittlement of hydrogel particles. Then, it is preferably 0.01 mol % or more, more preferably 0.1 mol % or more, further preferably 0.5 mol % or more from the viewpoint of promoting a cross-linking reaction, and rapidly forming hydrogel particles, and from the viewpoint of improving the elastic modulus of obtained hydrogel particles. A desirable range is 0.01 to 10 mol %, more preferably 0.1 to 5 mol %, further preferably 0.5 to 3 mol %.

<Production Method of Monodisperse Hydrogel Particles>

A method of producing monodisperse hydrogel particles in the present invention is not particularly limited, but it is desirable that the production is carried out through first, a step of preparing an uncured gel solution (ungelled solution) containing the vinyl alcohol-based polymer (an uncured gel solution preparation step), and a step of forming the uncured gel solution into particles (a particle forming step), and then, a step of gelling the vinyl alcohol-based polymer included in the uncured gel solution through cross-linking (a cross-linking step). Hereinafter, a specific method will be described.

[Uncured Gel Solution Preparation Step]

The uncured gel solution preparation step in the present invention is a step of preparing an uncured gel solution containing the vinyl alcohol-based polymer, and in the obtaining, the vinyl alcohol-based polymer may be dissolved in a solvent.

As for the solvent, water is preferable, and a water-soluble organic solvent may be further contained. As for the water-soluble organic solvent, water-soluble organic solvents, e.g., an aprotic polar solvent such as dimethylformamide, dimethylacetamide, dimethylsulfoxide, or N-methylpyrrolidone, monoalcohol such as methanol, ethanol, propanol, or isopropanol; and polyhydric alcohol such as ethyleneglycol, diethyleneglycol, triethyleneglycol, or glycerin, may be used through mixing.

When the uncured gel solution contains the water-soluble organic solvent, the content is preferably 30% by mass or less, more preferably 20% by mass or less, further preferably 10% by mass or less.

The content of the solvent in the uncured gel solution is preferably 50% by mass or more, more preferably 55% by mass or more, further preferably 60% by mass or more, and is preferably 99% by mass or less, more preferably 98% by mass or less, further preferably 95% by mass or less.

In addition, the content of the vinyl alcohol-based polymer in the uncured gel solution is preferably 1% by mass or more, more preferably 2% by mass or more, further preferably 5% by mass or more. In addition, it is preferably 50% by mass or less, more preferably 45% by mass or less, further preferably 40% by mass or less from the viewpoint of suppressing a viscosity increase of the uncured gel solution, and obtaining a good moldability. When the content of the vinyl alcohol-based polymer is less than 1% by mass, the strength of the obtained gel is low, and when it exceeds 50% by mass, the viscosity of the uncured gel solution is high, and it becomes difficult to form fine particles.

In the uncured gel solution, the vinyl alcohol-based polymer may be gelled through cross-linking by active energy rays or heat in the cross-linking step to be described below, and accordingly the hydrogel particles of the present invention can be obtained. Examples of the active energy rays include gamma rays, ultraviolet rays, visible rays, infrared rays (heat rays), radio waves, alpha rays, beta rays, electron beam, plasma stream, ionizing radiation, and particle beam.

(Radical Polymerization Initiator)

When cross-linking is carried out for the vinyl alcohol-based polymer by heat or ultraviolet rays, visible rays, infrared rays (heat rays) or the like among the active energy rays, it is desirable that the uncured gel solution contains a radical polymerization initiator. Examples of the radical polymerization initiator include a photo-radical polymerization initiator, and a thermal radical polymerization initiator.

The photo-radical polymerization initiator is not particularly limited as long as it initiates radical polymerization by irradiation of active energy rays such as ultraviolet rays or visible rays, etc. and those exhibiting water-solubility are preferable. Specifically, examples thereof include α-ketoglutaric acid, 1-[4-(2-hydroxyethoxy)-phenyl]-2-hydroxy-2-methyl-1-propane-1-one (product name "IRGACURE2959," manufactured by BASF Japan Co., Ltd.), phenyl(2,4,6-trimethylbenzoyl) lithium phosphinate (product name "L0290," manufactured by Tokyo Chemical Industry Co., Ltd.), 2,2'-azobis[2-methyl-N-(2-hydroxyethyl)propionamide] (product name "VA-086," manufactured by Wako Pure Chemical Corporation), and eosin Y.

The thermal radical polymerization initiator is not particularly limited as long as it initiates radical polymerization by heat, and examples thereof include an azo-based initiator, and a peroxide-based initiator which are generally used in radical polymerization. From the viewpoint of improving the transparency and physical properties of the vinyl alcohol-based polymer, a peroxide-based initiator that does not generate a gas is preferable, and from the viewpoint that the uncured gel solution is an aqueous solvent, a peroxide-based initiator with a high water-solubility is more preferable. Specific examples thereof include inorganic peroxides such as ammonium persulfate, potassium persulfate, and sodium persulfate.

In addition, a redox-based polymerization initiator combined with a reducing agent may be used. In the case of the redox-based polymerization initiator, curing may be carried out by stimulation of mixing of a peroxide-based initiator with a reducing agent. As for the reducing agent to be combined for the redox-based polymerization initiator, conventionally known reducing agents may be used, and among them, N,N,N',N'-tetramethylethylenediamine, sodium sulfite, sodium bisulfite, sodium hydrosulfite, etc. which have a high water-solubility, are preferable.

As long as the transparency or the physical properties of the hydrogel particles of the present invention are not impaired, a water-soluble azo-based initiator may be used. Specific examples thereof include 2,2'-azobis[2-(2-imidazolin-2-yl)propane]dihydrochloride (product name "VA-044"), 2,2'-azobis[2-(2-imidazolin-2-yl)propane]disulfate dihydrate (product name "VA-044B"), 2,2'-azobis[2-methylpropionamidine] dihydrochloride (product name "V-50"), 2,2'-azobis[N-(2-carboxyethyl)-2-methylpropionamidine] tetrahydrate (product name "VA-057"), 2,2'-azobis[2-(2-imidazolin-2-yl)propane] (product name "VA-061"), 2,2'-azobis[2-methyl-N-(2-hydroxyethyl)propionamide] (product name "VA-086"), and 4,4'-azobis(4-cyanopentanoic acid) (product name "V-501") (these are manufactured by Wako Pure Chemical Corporation).

The content of the radical polymerization initiator in the uncured gel solution may be properly adjusted according to the type of the radical polymerization initiator, but is preferably $5 \times 10^{-6}$% by mass or more, more preferably $1 \times 10^{-5}$% by mass or more from the viewpoint of promoting a cross-link reaction, and improving the mechanical strength of hydrogel particles. Meanwhile, from the viewpoint of reducing the radical polymerization initiator remaining in the hydrogel particles and suppressing the embrittlement of the hydrogel particles, the content of the radical polymerization initiator is preferably 3% by mass or less, more preferably 1% by mass or less, further preferably 0.5% by mass or less.

(Monomer that May be Contained in Uncured Gel Solution)

The uncured gel solution may further contain a monomer from the viewpoint of improving the mechanical strength of hydrogel particles. Examples of the monomer include acrylamides such as acrylamide, N-isopropylacrylamide, 2-acrylamide-2-methylpropanesulfonic acid, and N,N-dimethylacrylamide; α,β-unsaturated carboxylic acids such as (meth)acrylic acid, crotonic acid, itaconic acid, maleic acid, and fumaric acid; and water-soluble radically polymerizable monomers such as vinylpyridine, hydroxyethyl(meth)acrylate, styrenesulfonic acid, and polyethyleneglycolmono(meth)acrylate, or a cross-linking agent having two or more ethylenically unsaturated groups in the molecule such as N,N'-methylenebisacrylamide, ethyleneglycoldi(meth)acrylate, diethyleneglycoldi(meth)acrylate, or polyethyleneglycoldi(meth)acrylate.

When the uncured gel solution contains the monomer, the content is preferably 20% by mass or less, more preferably 10% by mass or less, further preferably 5% by mass or less from the viewpoint of improving the mechanical strength of hydrogel particles.

The uncured gel solution may further contain additives such as a light absorber, a polymerization inhibitor, a chain transfer agent, a colorant, or a preservative as long as the effect of the present invention is not impaired. One of the additives may be used alone or two or more thereof may be used in combination.

[Particle Forming Step]

In the production of the hydrogel particles of the present invention, a method of forming the uncured gel solution into particles is not particularly limited, but, the particles may be produced through a conventionally known technology for example, a suspension polymerization method, a membrane emulsification method, a microfluid method, a nozzle extrusion method, a spray drying method or the like. Besides, for example, a submerged electrospray method or the like as described in Biotechnology and Bioengineering (2012, Vol 109, pp. 1561-1570), may also be used.

The suspension polymerization method is a method in which in a water-in-oil type liquid-liquid dispersion system including the uncured gel solution as a disperse phase, and a liquid incompatible with this as a continuous phase, the uncured gel solution is cured to obtain hydrogel particles. In the uncured gel solution, the radical polymerization initiator may be dissolved, and to the continuous phase, as necessary an emulsion stabilizer may be added. The disperse phase is formed into microdroplets by mechanical energy (in general, stirring blades), and cross-linking of the uncured gel solution proceeds inside the droplets. More specifically a basic method described in Non-Patent Document 3 may be used. In the microdroplet formation, a static mixer may be used.

The membrane emulsification method is a method in which the uncured gel solution is extruded into the continuous phase through a film having a uniform pore diameter to form uniform water-in-oil type microdroplets, and the uncured gel solution is cured to obtain hydrogel particles. As in the suspension polymerization method, to the continuous phase, as necessary an emulsion stabilizer may be added. As for the film having a uniform pore diameter, an SPG film (Shirasu Porous Glass) or a hydrophilic or hydrophobic film having a uniform pore, which is manufactured by Micropore Technologies, may be used. For example, a basic method described in Journal of Membrane Science (2017, Vol 524, pp. 79 to 86) may be used.

The microfluid method is a method in which while the continuous phase flows into a micrometer-order microchannel, the uncured gel solution as a disperse phase is similarly injected thereto through a micrometer-order microchannel to form microdroplets, and the vinyl alcohol-based polymer is gelled so as to produce hydrogel particles. Depending on a method of injecting the disperse phase into the continuous phase, there are a terrace-like device, T-junction, an FFD (a flow focusing microchannel device), capillary type devices (a parallel flow method, an orthogonal flow method, and an FFD method) and the like. For example, a method described in Chemical Engineering and Technology (2008, Vol 31, pp. 1099 to 1115), Non-Patent Document 6 or the like is applicable. In the microfluid method as well, to the continuous phase, as necessary, an emulsion stabilizer may be added.

As for the emulsion stabilizer, for example, water-soluble polymers such as a partially saponified product of polyvinyl alcohol, gelatin, hydroxymethylcellulose, methylcellulose, and carboxymethylcellulose, and surfactants such as dodecylbenzenesulfonic acid sodium, sorbitanmonooleate, dioctylsulfosuccinate, polyoxyethylenesorbitanmonooleate (Tween-80), and polyoxyethylenesorbitanmonostearate (Tween-60) may be used.

As for the liquid incompatible with the disperse phase, for example, water-insoluble oil, toluene, hexane, octane (including isooctane), liquid paraffin, cooking oil, and dichloroethane are generally used.

The nozzle extrusion method is a method in which the uncured gel solution is extruded into air from a nozzle and is dropped to the continuous phase to form water-in-oil type microdroplets, and the uncured gel solution is cured to obtain hydrogel particles. In order to efficiently generate droplets, for example, the particle formation can be carried out while the nozzle is vibrated or the uncured gel solution is mechanically cut by using a rotary disc or a rotary nozzle. As for a method of producing gel particles by the nozzle extrusion method, a method described in Chemical Papers (2008, Vol 62, pp. 364 to 374) or the like may be exemplified. In the nozzle extrusion method, while droplets are falling in the air, the vinyl alcohol-based polymer may be gelled by the method so that it is also possible to obtain the hydrogel particles of the present invention without using the continuous phase.

In the nozzle extrusion method, for example, the uncured gel solution in which alginic acid or the like is dissolved can be dropped to a polyvalent metal ion solution by the nozzle extrusion method to form particles. This is a method using a characteristic that alginic acid is gelled by polyvalent metal ions, and after the particle formation, the vinyl alcohol-based polymer having an ethylenically unsaturated group may be cured by a method to be described below so as to obtain the hydrogel particles of the present invention.

In the spray drying method, the uncured gel solution is passed through a nozzle, a rotary disc or the like and is atomized to form microdroplets, and through drying by heat, particles are obtained. When a photo-radical polymerization initiator is used, gelation of the vinyl alcohol-based polymer is possible by irradiation of light at the stage where microdroplets are formed, and when a thermal radical polymerization initiator is used, gelation is also possible during thermal drying of microdroplets. Of course, after dried particles are obtained, depending on the type of the radical polymerization initiator, light or heat may be applied to perform gelation, and then the hydrogel particles of the present invention may be obtained.

As for the method of producing the hydrogel particles of the present invention, all of these particle production methods can be suitably used, but from the viewpoint of controlling a particle size distribution of hydrogel particles as described below, a suspension polymerization method using a static mixer, a membrane emulsification method, a microfluid method, a nozzle extrusion method, and a spray drying method are preferable, and a membrane emulsification method, a microfluid method, and a nozzle extrusion method are more preferable. These methods basically have a characteristic in that the volume of microdroplets can be strictly defined by using pores or a nozzle, which contributes to the control of the particle size distribution.

[Cross-Linking Step]

It is desirable that the hydrogel particles of the present invention are produced through a cross-linking step of cross-linking the vinyl alcohol-based polymer after the particle forming step. The cross-linking in this step may be performed by the active energy rays or heat. When the uncured gel solution contains a photo-radical polymerization initiator, examples of the active energy rays that may be used for irradiation treatment include visible rays, and ultraviolet rays.

When the uncured gel solution contains a thermal radical polymerization initiator, it is desirable that heating is performed at a temperature of less than 100° C. The heating temperature may be properly adjusted according to the type of the used thermal radical polymerization initiator, and is preferably 40 to 90° C., more preferably 50 to 80° C.

(Polythiol)

In the cross-linking step, when the vinyl alcohol-based polymer having a vinyl group as the ethylenically unsaturated group is used, from the viewpoint of promoting curing, for example, polythiol having two or more thiol groups in the molecule may be added so that a thiol-ene reaction may be used for cross-linking.

As for polythiol, those exhibiting water-solubility are preferable, and examples thereof include polythiol having a hydroxy group, such as dithiothreitol; and polythiol containing an ether bond such as a terminal thiol product, such as 3,6-dioxa-1,8-octanedithiol, polyethyleneglycoldithiol, and multi-arm polyethyleneglycol.

In the thiol-ene reaction, a vinyl group reacts with a thiol group in a one-to-one manner in principle, and thus, it is desirable that the polythiol is added such that thiol groups do not become largely excessive as compared to vinyl groups. Specifically the amount of the thiol group relative to 1 mole of the vinyl group is preferably 0.1 to 5 moles, more preferably 0.3 to 2 moles, further preferably 0.5 to 1 moles. When the amount of the thiol group relative to 1 mole of the vinyl group falls within the above range, the mechanical strength or the like of hydrogel particles is improved. Curing through the thiol-ene reaction may be used for the vinyl alcohol-based polymer having a vinyloxycarbonyl group as the ethylenically unsaturated group.

<Average Particle Size and Particle Size Distribution of Hydrogel Particles>

The hydrogel particles of the present invention have characteristics that the average particle size is 10 to 5,000 μm, and the coefficient of variation of a particle size distribution (logarithmic scale) is 10% or less. From the viewpoint of the viscosity and the gel strength of the uncured gel solution and the viewpoint of improving the applicability in various applications, the average particle size of the hydrogel particles of the present invention is more preferably 20 μm or more, further preferably 50 μm or more, still more preferably 80 μm or more, even still more preferably 100 μm or more. Since the upper limit value is hardly affected by the viscosity of the uncured gel solution, as long as the average particle size is 5,000 μm or less, free production is possible, but it is more preferably 4,500 μm or less, further preferably 4,000 μm or less, still more preferably 3,000 μm or less, yet more preferably 2,000 μm or less, even still more preferably 1,500 μm or less. A desirable range of the average particle size is 10 to 5,000 μm, more preferably 20 to 4,500 μm, further preferably 50 to 4,000, still more preferably 80 to 3,000, yet more preferably 100 to 2,000, even still more preferably 100 to 1,500.

The coefficient of variation of a particle size distribution (logarithmic scale) of the hydrogel particles of the present invention is 10% or less. When the coefficient of variation of a particle size distribution (hereinafter, also abbreviated as "Cv value") is greater than 10%, the non-uniformity of particle sizes of the hydrogel particles becomes too large, and as a result, there is a concern about the control on the surface area of hydrogel particles or the diffusion of substances into the inside, and furthermore, the increase of the pressure loss during filtration. In addition, when the Cv value is too large, a classification process using a sieve is required in order to obtain hydrogel particles having a desired particle size, and also it is necessary to discard hydrogel particles having a particle size unsuitable for a purpose. Thus, a production cost is increased. In addition, depending on the application, in the filter separation of the hydrogel particles, a problem occurs in which hydrogel particles having a small particle size are mixed into the filtrate side. From this viewpoint, the Cv value is preferably 8% or less, more preferably 6% or less, further preferably 4% or less. There is no particular lower limit value of the coefficient of variation of a particle size distribution (logarithmic scale), but it is usually 0.01% or more. A desirable range is 0 to 10%, more preferably 0.01 to 8%, further preferably 0.01 to 4%.

The average particle size of the hydrogel particles of the present invention is measured by using a laser diffraction/scattering type particle size distribution measuring device, but instead, the particle sizes may be measured by actually observing particles with a microscope. The average particle size in the present invention refers to the volume-based average particle size of particle sizes (equivalent spherical diameters). In the case of a microscopy method, at least 100 or more hydrogel particles are directly observed to measure particle sizes, and the volume-based average particle size is calculated.

The coefficient of variation of a particle size distribution of the hydrogel particles of the present invention is on a logarithmic scale, and is measured by using a laser diffraction/scattering type particle size distribution measuring device. Otherwise, as described above, at least 100 or more hydrogel particles may be directly observed with a microscope and then a particle size distribution may be measured. When a particle size distribution curve (based on a volume and on a logarithmic scale) obtained by the laser diffraction/scattering type particle size distribution measuring device is used, a particle size (equivalent spherical diameter) and a Cv (unit is %) are calculated from the following formulas (1) and (2).

$$Cv(\%) = \left[\left[\sum_{j=1}^{n} q_j\{(\log x_j + \log x_{j+1})/2 - \mu\}^2 / 100\right]^{1/2} \bigg/ \mu\right] \times 100 \quad (1)$$

$$\mu = \left[\sum_{j=1}^{n} q_j\{(\log x_j + \log x_{j+1})/2\}\right] \bigg/ 100 \quad (2)$$

[In each formula, $\mu$: average value (logarithmic scale), $x_j$: particle size, $q_j$: frequency (%)]

When a Cv value is obtained by directly observing hydrogel particles with a microscope, calculation is carried out through the following formulas (3) and (4).

$$Cv(\%) = \left[\left(\sum_{j=1}^{n} [\log x_j - \mu]^2 / n\right)^{1/2} \bigg/ \mu\right] \times 100 \quad (3)$$

$$\mu = \sum_{j=1}^{n} \log x_j / n \quad (4)$$

[In each formula, $\mu$: average value (logarithmic scale), $x_j$: particle size, n: number of particles]

The particle size distribution of the hydrogel particles of the present invention has monodispersity, and thus, a difference between the average particle size calculated on the volume basis, and the average particle size calculated on the number basis becomes small. Accordingly in the hydrogel particles of the present invention, the ratio of the average particle size (on the number basis)/the average particle size (on the volume basis) is preferably 0.5 or more, more preferably 0.6 or more, further preferably 0.7 or more, still more preferably 0.8 or more, and is usually 1.0 or less.

<Porosification of Hydrogel Particles>

The hydrogel particles of the present invention may be porous. Examples of the method of making the hydrogel particles porous include a ghost formation method and a phase separation method. The ghost formation method is a method in which hydrogel particles are produced by mixing the uncured gel solution with, for example, calcium sulfate fine particles as water-insoluble particles, and then, the calcium sulfate fine particles are dissolved in an acidic aqueous solution so that voids are formed and porosification is made. In addition, the phase separation method is a method in which hydrogel particles are produced by mixing the uncured gel solution with polyethyleneglycol, gelatin, or the like, which is a water-soluble polymer phase-separated from PVA, and then, the water-soluble polymer is extracted with water. It is expected that the porosification will accelerate the diffusion of substances into the inside of hydrogel particles, and thus the activity of cells or microorganisms will be maintained. Any method can be used depending on the application.

<Content of Solvent in Hydrogel Particles>

The hydrogel particles of the present invention may be used in a state where a solvent is not contained, but may be used after an equilibrium swelling state is made through immersion in a solvent such as water. Through the immersion operation, the effect of removing unreacted raw materials containing a radical polymerization initiator or non-crosslinked polymer components can be expected, and thus it is possible to further reduce the content of the unreacted raw materials or the non-crosslinked polymer components. In order to further remove the unreacted raw materials or the non-crosslinked polymer components, the immerse operation may be repeated through exchange of a solvent. The hydrogel particles of the present invention may be dried by hot air, freeze-drying or the like so as to remove a solvent such as water, and then may be immersed in a solvent such as water again and may be used after an equilibrium swelling state is made.

[Solvent that May be Contained in Hydrogel Particles]

As for a solvent that may be contained in the hydrogel particles of the present invention, water may be exemplified. In addition, when water is contained as a solvent, a water-soluble organic solvent may be further contained. Examples of the water-soluble organic solvent include aprotic polar solvents such as dimethylformamide, dimethylacetamide, dimethylsulfoxide, and N-methylpyrrolidone, monoalcohols such as methanol, ethanol, propanol, and isopropanol; and polyhydric alcohols such as ethyleneglycol, diethyleneglycol, triethyleneglycol, and glycerin.

When the hydrogel particles of the present invention contain a solvent, the content of the solvent in the hydrogel particles is preferably 5% by mass or more, more preferably 10% by mass or more, further preferably 20% by mass or more, still more preferably 30% by mass or more from the viewpoint of improving the flexibility of the hydrogel particles. Then, the upper limit of the content of the solvent is not particularly limited, but is preferably 99% by mass or less, more preferably 98% by mass or less, further preferably 95% by mass or less from the viewpoint of improving the mechanical strength of the hydrogel particles. When a water-soluble organic solvent is contained as a solvent, the content of the solvent is the total amount of water and the water-soluble organic solvent.

The content of the solvent in the hydrogel particles can be measured by using a drying method. Specifically a sample may be heated and kept for a certain period of time, so that a solvent in the sample may be evaporated and dried, and then the amount of a decrease in the sample mass before and after the heating and drying may be obtained as the content of the solvent.

Meanwhile, when the hydrogel particles contain a solvent, the content of a cross-linked product of the vinyl alcohol-based polymer in the hydrogel particles is preferably 1% by mass or more, more preferably 2% by mass or more, further preferably 5% by mass or more, and is preferably 95% by mass or less, more preferably 90% by mass or less, further preferably 80% by mass or less, still more preferably 70% by mass or less. When the content of the cross-linked product of the vinyl alcohol-based polymer in the hydrogel particles falls within the above range, the hydrogel particles have a sufficient strength.

<Additives that May be Contained in Hydrogel Particles>

The hydrogel particles of the present invention may contain polymer fine particles and inorganic fine particles for the purpose of improving the mechanical strength of the hydrogel particles, and also, may be combined with a carboxy group-containing water-soluble polymer to form mutual penetration type gel.

[Polymer Fine Particles]

The hydrogel particles of the present invention may contain polymer fine particles from the viewpoint of improving the mechanical strength. In the case where the polymer fine particles are contained, when an external stress is applied to the hydrogel particles, the polymer fine particles relieve the stress and/or disintegrate, so that the stress is dissipated. Thus, the progress of minute cracks occurring in the hydrogel particles can be stopped. This prevents disintegration of the entire gel, and increases the toughness of the gel.

As for the polymer fine particles, hard and soft polymer fine particles which can be produced by usual emulsion polymerization may be used.

A polymer constituting the polymer fine particles may be a polymer composed of one type of monomer unit, or may be a copolymer composed of a plurality of types of monomer units. In addition, it may be a mixture of a plurality of polymers.

Examples of the monomer include conjugated dienes such as butadiene, and isoprene; aromatic vinyl compounds such as styrene, α-methylstyrene, and tert-butylstyrene; (meth) acrylic acid and its salt; (meth)acrylic acid esters such as methyl (meth)acrylate, ethyl (meth)acrylate, n-propyl (meth)acrylate, n-butyl (meth)acrylate, isopropyl (meth) acrylate, dicyclopentanyl (meth)acrylate, trimethylolpropanetri (meth)acrylate, and allyl (meth)acrylate; (meth)acrylamide; (meth)acrylamide derivatives such as N-methyl (meth)acrylamide, and N-ethyl(meth)acrylamide; nitriles such as (meth)acrylonitrile; vinylethers such as methylvinylether, ethylvinylether, n-butylvinylether, and isobutylvinylether; vinyl esters such as vinyl acetate, vinyl n-propionate, vinyl butyrate, and vinyl pivalate; unsaturated dicarboxylic acid anhydrides such as maleic anhydride, and itaconic anhydride; monoolefins such as ethene, propene, n-butene, and isobutene; ethylene halides such as vinyl bromide, vinylidene bromide, vinyl chloride, vinylidene chloride, vinyl fluoride, and vinylidene fluoride; allyl compounds such as allyl acetate, and allyl chloride; unsaturated dicarboxylic acids such as maleic acid, fumaric acid, and itaconic acid, and salts thereof; unsaturated dicarboxylic acid esters such as maleic acid ester, and itaconic acid ester; vinylsilyl compounds such as trimethoxysilane; cyclic dienes such as cyclopentadiene and norbornadiene; indenes such as indene and tetrahydroindene; cyclic ethers such as ethylene oxide, propylene oxide, oxetane, and tetrahydrofuran; cyclic sulfides such as thiirane and thietane; cyclic amines such as aziridine and azetidine; cyclic acetals such as 1,3-dioxolane, 1,3,5-trioxane, and spiro orthoester; cyclic iminoethers such as 2-oxozaline and iminoether; lactones such as β-propiolactone, δ-valerolactone, and ε-caprolactone; cyclic carbonates such as ethylenecarbonate and propylenecarbonate; cyclic siloxanes such as hexamethylcyclotrisiloxane, octamethylcyclotetrasiloxane, and decamethylcyclopentasiloxane.

Among them, from the viewpoint of productivity, at least one monomer selected from the group consisting of a conjugated diene, an aromatic vinyl compound and a (meth) acrylic acid ester is preferable.

As for the polymer fine particles, from the viewpoint of dispersibility in water, a polymer having a surface hydrophilized with a surfactant or the like is preferable. In addition, the method of producing the polymer fine particles is not particularly limited, but, for example, emulsion polymerization, suspension polymerization, self-emulsification or mechanical emulsification of a resin, etc. may be used for production.

The average particle size of the polymer fine particles is preferably 0.01 to 10 μm, more preferably 0.02 to 1 μm, further preferably 0.04 to 0.5 μm. When the average particle size is large, the gel itself tends to become turbid and lose transparency, and particles are likely to settle, whereas the improvement of gel strength can be expected even by a small amount of content. Meanwhile, when the average particle size is small, the content needs to be increased to improve the gel strength, but there is a tendency that gel having a high transparency is obtained.

The average particle size of the polymer fine particles in the present invention refers to the average particle size measured by a dynamic light scattering measuring device to be described below.

In the emulsion polymerization according to the production method of the polymer fine particles, a surfactant is usually used. Examples of such a surfactant include anionic surfactants such as sodium alkylbenzene sulfonate, sodium lauryl sulfate, higher fatty acid sodium, and rosin-based soap; nonionic surfactants such as alkyl polyethylene glycol, and nonylphenol ethoxylate; cationic surfactants such as distearyldimethylammonium chloride, and benzalkonium chloride; and amphoteric surfactants such as cocamidopropyl betaine, and cocamidopropylhydroxy sultaine. In addition, it is also possible to use polymer surfactants such as partially saponified PVA (saponification degree: 70 to 90 mol %), mercapto group-modified PVA (saponification degree: 70 to 90 mol %), β-naphthalenesulfonic acid formalin condensate salt, and ethyl (meth)acrylate copolymer.

In the emulsion polymerization according to the production method, a radical polymerization initiator is usually used. Examples of such a radical polymerization initiator include a water-soluble inorganic polymerization initiator, a water-soluble azo-based polymerization initiator, an oil-soluble azo-based polymerization initiator, and organic peroxide. In addition, as for the radical polymerization initiator, a redox-based polymerization initiator may be used. In addition, as necessary a metal ion chelating agent, electrolyte as a thickening inhibitor, and a chain transfer agent may be added to the emulsion polymerization system.

In addition, in the production method of the polymer fine particles, the production may also be carried out by a method of preliminarily preparing a polymer such as natural rubber, or rubber (e.g., a styrene-butadiene copolymer, polybutadiene, polyisoprene, an isobutylene-isoprene copolymer, a styrene-isoprene copolymer, a styrene-isoprene-butadiene copolymer, a halogenated isobutylene-isoprene copolymer, an ethylene-propylene-butadiene copolymer, an acrylonitrile-butadiene copolymer, a partially hydrogenated product of an acrylonitrile-butadiene copolymer, and polychloroprene), and extracting these through spray-drying, etc. after emulsification or suspension in water.

When polymer particles having a glass transition temperature of 25° C. or less are produced by the method, particles are fused to each other and re-dispersion in water or the like becomes difficult. Thus, in a desirable method, for example, partially saponified PVA or the like which is a polymer surfactant is used as an emulsifier so as to perform emulsification.

[Inorganic Fine Particles]

The hydrogel particles of the present invention may contain water-insoluble inorganic fine particles from the viewpoint of improving the mechanical strength. Examples of the water-insoluble inorganic fine particles include silica such as precipitated silica, gel-like silica, vapor phase method silica, and colloidal silica; ceramics such as alumina, hydroxyapatite, zirconia, zinc oxide, and barium titanate; minerals such as zeolite, talc, and montmorillonite; plaster such as calcium sulfate; metal oxides such as calcium oxide, and iron oxide; metal carbonates such as calcium carbonate, and magnesium carbonate; diatomaceous earth, soil, clay, sand, and gravel. One of the inorganic fine particles may be used alone or two or more thereof may be used in combination. By adding the water-insoluble inorganic fine particles, it is possible to impart functions such as high mechanical properties or magnetic properties, to the hydrogel particles. In addition, it is also possible to obtain an inorganic sintered body by drying the hydrogel particles together with the inorganic fine particles, and furthermore performing sintering or the like.

[Carboxy Group-Containing Water-Soluble Polymer (Formation of Mutual Penetration Gel)]

The hydrogel particles of the present invention may be used in combination with a carboxy group-containing water-soluble polymer so as to form mutual penetration gel. As for the carboxy group-containing water-soluble polymer, in particular, from the viewpoint of safety naturally derived polysaccharides are preferable, and alginic acid, carboxymethylcellulose, LM pectin, carboxymethyl starch and derivatives thereof may be exemplified. These carboxy group-containing water-soluble polymers may be cross-linked by polyvalent metal ions such as magnesium, calcium, barium, strontium, copper, iron, manganese, and zinc.

The vinyl alcohol-based polymer cross-linked by a radical polymerization initiator and the carboxy group-containing water-soluble polymer cross-linked by polyvalent metal ions may form mutual penetration type gel, so that it is possible to increase the mechanical strength of the hydrogel particles.

When the hydrogel particles contain one or more additives selected from polymer fine particles and inorganic fine particles, the content is preferably 0.1 to 20 parts by mass relative to 100 parts by mass of the vinyl alcohol-based polymer having an ethylenically unsaturated group, more preferably 0.5 to 20 parts by mass, further preferably 1 to 15 parts by mass. When the content of one or more additives selected from polymer fine particles and inorganic fine particles falls within the above range, the mechanical strength of the hydrogel particles is improved.

<Use of Hydrogel Particles>

The hydrogel particles of the present invention are excellent in hydrophilicity reactivity, biodegradability, biocompatibility, low toxicity etc., and have a very small particle size distribution, and a high mechanical strength. Thus, its suitable use is possible in various fields such as an adsorption carrier of metal ions or the like; an enzyme immobilization carrier; a drug delivery carrier; an affinity carrier; an encapsulation carrier of cells or microorganisms; particles for vascular embolization; and a carrier for drainage treatment.

The hydrogel particles of the present invention may be used in combination with cells, or a physiologically active substance or an enzyme or may include these.

The term "cell" in the present specification is not particularly limited, but preferably includes mammalian-derived established cells and insect cells, which are used for therapies or production of useful substances such as pluripotent stem cells, tissue stem cells, somatic cells, and medical supplies.

The cell includes an adherent cell and a suspension cell. The adherent cell refers to a cell that proliferates by adhering to a carrier such as the hydrogel particles of the present invention during cell culturing. The suspension cell refers to a cell that does not basically require adhering to a carrier in cell proliferation. The suspension cell includes a cell capable of weakly adhering to a carrier.

The pluripotent stem cell is a stem cell having an ability to differentiate into cells of any tissue (differentiation pluripotency), and examples thereof include an embryonic stem cell (ES cell), an induced pluripotent stem cell (iPS cell), an embryonic germline stem cell (EG cell), and a germline stem cell (GS cell).

The tissue stem cell means a stem cell having an ability to differentiate into various cell types (differentiation pluripotency) although tissues for differentiation are limited. Examples of the tissue stem cell include a bone marrow undifferentiated mesenchymal stem cell, a skeletal muscle stem cell, a hematopoietic stem cell, a neural stem cell, a liver stem cell, an adipose tissue stem cell, an epidermal stem cell, an intestinal stem cell, a sperm stem cell, a pancreatic stem cell (a pancreatic duct epithelial stem cell, etc.), a leukocyte stem cell, a lymphocytic stem cell, and a corneal stem cell.

The somatic cell refers to a cell constituting a multicellular organism, and examples thereof include an osteoblast, a cartilage cell, a hematopoietic cell, an epithelial cell (a mammary epithelial cell etc.), an endothelial cell (a vascular endothelial cell etc.), an epidermal cell, a fibroblast, a mesenchymal-derived cell, a cardiomyocyte, a myoblast, a smooth muscle cell, a living body-derived skeletal muscle cell, a human tumor cell, a fibrous cell, an EB virus mutant cell, a hepatocyte, a kidney cell, a bone marrow cell, a macrophage, a parenchymal hepatocyte, a small intestinal cell, a mammary gland cell, a salivary gland cell, a thyroid cell, a skin cell, a plasma cell, a T cell, a B cell, a killer cell, a lymphoblast, and a pancreatic β cell, but are not limited thereto.

Examples of the mammalian derived established cell include a CRFK cell, a 3T3 cell, an A549 cell, an AH130 cell, a B95-8 cell, a BHK cell, a BOSC23 cell, a BS-C-1 cell, a C3H10T½ cell, a C-6 cell, a CHO cell, a COS cell, a CV-1 cell, an F9 cell, an FL cell, an FL5-1 cell, an FM3A cell, a G-361 cell, a GP+E-86 cell, a GP+envAm12 cell, an H4-II-E cell, an HEK293 cell, an HeLa cell, an HEp-2 cell, an HL-60 cell, an HTC cell, an HUVEC cell, an IMR-32 cell, an IMR-90 cell, a K562 cell, a KB cell, an L cell, an L5178Y cell, an L-929 cell, an MA104 cell, an MDBK cell, an MDCK cell, an MIA PaCG-2 cell, an N18 cell, an Namalwa cell, an NG108-15 cell, an NRK cell, an OC10 cell, an OTT6050 cell, a P388 cell, a PA12 cell, a PA317 cell, a PC-12 cell, a PER.C6 cell, a PG13 cell, a QGH cell, a Raji cell, an RPMI-1788 cell, an SGE1 cell, an Sp2/O—Ag14 cell, an ST2 cell, a THP-1 cell, a U-937 cell, a V79 cell, a VERO cell, a WI-38 cell, a Ψ2 cell, and a ΨCRE cell {Cell Culture Technology (edited by Japanese Tissue Culture Association, published by Asakura Publishing Co., Ltd., 1999)}.

Examples of the insect cell include a *Bombyx mori* cell (a BmN cell, a BoMo cell, etc.), a silkworm cell, a *Bombyx mandarina* cell, a samia *Cynthia pryeri* cell, a noctuidae cell (a Sf9 cell, a Sf21 cell, etc.), a *Lemyra imparilis* cell, a Tortricidae larva cell, a *drosophila* cell, a *Sarcophaga bercaea* cell, an *Aedes albopictus* cell, a *Papilio xuthus* cell, an american cockroach cell and a *Trichoplusia ni* cell (a Tn-5 cell, a HIGH FIVE cell, an MG1 cell, etc.) {insect biofactory (edited by Kimura Shigeru, published by Kogyo Chosakai Publishing Co., Ltd., 2000)}.

The cells may be aggregated or differentiated from each other. The aggregated cells may have a function as an organ. The cells may be those which are instantly collected from a living body, or may be cultured. The cells collected from the living body may form an organ.

Examples of the physiologically active substance include cell adhesion proteins or peptides such as gelatin, collagen, laminin, fibronectin, and synthetic RGD peptide; growth factors such as a fibroblast growth factor (FGF), an epithelial growth factor (EGF), and a vascular endothelial growth factor (VEGF); acidic polysaccharides such as heparin and hyaluronic acid, and various medical supplies. Examples of the enzyme include protease, lipase, amylase, and cellulase.

[Composite]

A composite of the present invention is a composite of the monodisperse hydrogel particles of the present invention, and a physiologically active substance or an enzyme. More specifically, the composite of the present invention may be a composite in which the hydrogel particles simply contain the physiologically active substance or the enzyme, or a composite in which the hydrogel particles are covalently bonded to the physiologically active substance or the enzyme. However, a composite obtained through a covalent bond is preferable. When a covalent bond is formed by the hydrogel particles and the physiologically active substance or the enzyme, the physiologically active substance or the enzyme can be retained in the hydrogel particles, and can stably function.

In the method of covalently bonding the hydrogel particles and the physiologically active substance, for example, a hydroxy group of PVA is activated and is reacted with a functional group of the physiologically active substance or the enzyme so as to form a covalent bond. From the viewpoint of reaction efficiency it is desirable to use an amino group as the functional group of the physiologically active substance or the enzyme. In addition, examples of a specific method of activating the hydroxy group of PVA, include a method using an activating reagent such as 1,1'-carbonyldiimidazole, p-toluenesulfonic acid chloride, 2,2,2-trifluoroethanesulfonic acid chloride, or cyanuric acid chloride. When such an activating reagent is reacted with the hydroxy group of PVA, it becomes possible to form a covalent bond with the amino group of the physiologically active substance or the enzyme. Of course, it is possible to use an optimum method including another method depending on the application.

EXAMPLES

Hereinafter, the present invention will be described in more detail with reference to Examples, but the present invention is not limited by these Examples.

[Used Raw Material]

Main components used in Synthesis Examples, Examples and Comparative Examples will be described below.

<Raw Material PVA>
PVA105: polyvinyl alcohol (product name "PVA105," average degree of polymerization: 500, saponification degree: about 98.0 to 99.0 mol %, viscosity (4%, 20° C.): 5.2 to 6.0 mPa·s, manufactured by KURARAY Co., Ltd.)

PVA205: polyvinyl alcohol (product name "PVA205," average degree of polymerization: 500, saponification degree: about 86.5 to 89.0 mol %, viscosity (4%, 20° C.): 4.6 to 5.4 mPa·s, manufactured by KURARAY Co., Ltd.)

PVA117: polyvinyl alcohol (product name "PVA117," average degree of polymerization: 1700, saponification degree: about 98.0 to 99.0 mol %, viscosity (4%, 20° C.): 25.0 to 31.0 mPa·s, manufactured by KURARAY Co., Ltd.)

PVA103: polyvinyl alcohol (product name "PVA103," average degree of polymerization: 300, saponification degree: about 98.0 to 99.0 mol %, viscosity (4%, 20° C.): 3.2 to 3.8 mPa·s, manufactured by KURARAY Co., Ltd.)

The degree of polymerization of the raw material PVA was measured in accordance with JIS K 6726:1994.

<Ethylenically Unsaturated Group-Containing Compound>
vinyl methacrylate: manufactured by Tokyo Chemical Industry Co., Ltd.
5-norbornene-2-carboxyaldehyde: manufactured by Tokyo Chemical Industry Co., Ltd.

<Emulsifier>
mercapto group-modified PVA: manufactured by KURARAY Co., Ltd.

<Transition Metal Salt>
iron (II) sulfate (7 hydrate): manufactured by Wako Pure Chemical Corporation <Thickening Inhibitor>
sodium acetate: manufactured by Wako Pure Chemical Corporation <Monomer>
n-butyl acrylate: manufactured by Nippon Shokubai Co., Ltd.

<Chain Transfer Agent>
dodecyl mercaptan: manufactured by Aldrich Japan Co., Ltd.

<Radical Polymerization Initiator>
hydrogen peroxide aqueous solution: manufactured by Wako Pure Chemical Corporation
L0290: phenyl(2,4,6-trimethylbenzoyl) lithium phosphinate (photo-radical polymerization initiator, product name "L0290," manufactured by Tokyo Chemical Industry Co., Ltd.)
sodium persulfate: manufactured by Wako Pure Chemical Corporation <Carboxy Group-Containing Water-Soluble Polymer>
sodium alginate (NSPLLR) (product name "DUCK ALGIN NSPLLR," viscosity of 1% by mass aqueous solution (temperature: 20° C.): 40 to 50 mPa·s, manufactured by Kikkoman Corporation)

<Polythiol>
3,6-dioxa-1,8-octanedithiol: manufactured by Tokyo Chemical Industry Co., Ltd.

<Activating Reagent>
1,1'-carbonyldiimidazole: manufactured by Tokyo Chemical Industry Co., Ltd.

<Physiologically Active Substance>
gelatin (derived from cattle, type B): manufactured by Sigma Aldrich Japan Co., Ltd.

<Solvent>
ion exchanged water: ion exchanged water with an electrical conductivity of $0.08 \times 10^{-4}$ S/m or less

[Measurement Method of Compound Synthetized in Synthesis Example]

<Average Degree of Polymerization of Vinyl Alcohol-Based Polymer Having Ethylenically Unsaturated Group>

The average degree of polymerization of a vinyl alcohol-based polymer having an ethylenically unsaturated group obtained in the following Synthesis Example was measured in accordance with JIS K 6726:1994.

<Introduction Rate of Ethylenically Unsaturated Group>

The introduction rate of an ethylenically unsaturated group in the vinyl alcohol-based polymer having an ethylenically unsaturated group obtained in the following Synthesis Example was measured by $^1$H-NMR. It is possible to obtain the introduction rate from the ratio of the integrated value between signals of the ethylenically unsaturated group to signals of the vinyl alcohol-based polymer.

[$^1$H-NMR Measurement Condition]

Device: nuclear magnetic resonance spectrometer "JNM-ECX400" manufactured by JEOL Ltd.

temperature: 25° C.

<Average Particle Size in Emulsion>

In Synthesis Example A, for a mixed solution of an emulsion (0.1 mL) of polymer fine particles and ion exchanged water (10 mL), the particle size distribution of the polymer fine particles was measured on a volume basis by using a dynamic light scattering measuring device (device name: FPAR-1000, manufactured by OTSUKA ELECTRONICS CO., LTD), and a median diameter was measured as the average particle size.

SYNTHESIS EXAMPLE

<Synthesis of Vinyl Alcohol-Based Polymer Having Ethylenically Unsaturated Group>

Synthesis Example 1

40 g (monomer repeating unit: 908 mmol) of PVA105 (raw material PVA) was put in a separable flask equipped with a 1 L dimroth condenser, 350 mL of dimethylsulfoxide (DMSO) was added thereto, and stirring was started with a mechanical stirrer. The temperature was raised to 80° C. in a water bath, and then, stirring was continued at 80° C. for 4 h. After the dissolution of the raw material PVA was visually confirmed, 2.1 g (18.7 mmol) of vinyl methacrylate was added with heating and stirring at 80° C., and stirring was further performed at 80° C. for 3 h. After cooled, the reaction solution was poured into 2 L of methanol with stirring, and then was left as it was for 1 h when the stirring was stopped. The obtained solid was collected, and then, was further immersed in 1 L of methanol for 1 h and washed. This washing process was performed a total of 3 times. The collected solid was vacuum-dried overnight at a room temperature to obtain methacryloylated PVA105. The introduction rate of the ethylenically unsaturated group (methacryloyloxy group) in the methacryloylated PVA105 was 2.0 mol % relative to the repeating unit of the raw material PVA (hereinafter, abbreviated as "MA-PVA105 (2.0)").

Synthesis Examples 2 to 3

As noted in Table 1, methacryloylated PVA was produced in the same manner as in Synthesis Example 1 except that a raw material PVA having a different average degree of polymerization, and a different saponification degree was used.

Synthesis Example 4

60 g (monomer repeating unit: 1.36 mol) of PVA105 (raw material PVA) was put in a separable flask equipped with a 1 L dimroth condenser, 540 mL of ion exchanged water was added thereto, and stirring was started with a mechanical stirrer. The temperature was raised to 80° C. in a water bath, and then stirring was continued at 80° C. for 4 h. After the dissolution of the raw material PVA was visually confirmed, the temperature was lowered to 40° C. 2.5 g (20.5 mmol) of 5-norbornene-2-carboxyaldehyde and 22 mL of a 10 vol % sulfuric acid aqueous solution were added with stirring at 40° C., and stirring was further performed at 40° C. for 4 h. After cooled, this was neutralized with addition of 80 mL of a 1 N NaOH aqueous solution, and was desalted by being put into a dialysis membrane with a molecular weight cutoff of 3,500 (performed 4 times for 5 L of ion exchanged water). The desalted aqueous solution was poured into 2 L of methanol with stirring, and then was left as it was for 1 h. The obtained solid was collected, and then, was further immersed in 1 L of methanol for 1 h and washed. The collected solid was vacuum-dried overnight at a room temperature to obtain norbornene-PVA105. The introduction rate of the ethylenically unsaturated group (norbornenyl group) in the norbornene-PVA105 was 1.3 mol % relative to the repeating unit of the raw material PVA (hereinafter, abbreviated as "Nor-PVA105 (1.3)").

Comparative Synthesis Example 1

As noted in Table 1, MA-PVA103 (2.0) was produced in the same manner as in Synthesis Example 1 except that PVA103 was used as the raw material PVA.

TABLE 1

| | Vinyl alcohol-based polymer having ethylenically unsaturated group | | | |
|---|---|---|---|---|
| | Type | Raw material PVA | Degree of polymerization | Introduction rate of ethylenically unsaturated group (mol %) |
| Synthesis Example 1 | MA-PVA105(2.0) | PVA105 | 500 | 2.0 |
| Synthesis Example 2 | MA-PVA205(2.0) | PVA205 | 500 | 2.0 |
| Synthesis Example 3 | MA-PVA117(2.0) | PVA117 | 1700 | 2.0 |
| Synthesis Example 4 | Nor-PVA105(1.3) | PVA105 | 500 | 1.3 |
| Comparative Synthesis Example 1 | MA-PVA103(2.0) | PVA103 | 300 | 2.0 |

<Synthesis of Polymer Fine Particles>

Synthesis Example A (Step 1)

To a dried 2 L glass polymerization tank, 537.12 g of a 2% by mass aqueous solution of mercapto group-modified PVA (average degree of polymerization: 500, saponification degree: 88 mol %), 0.0059 g of iron (II) sulfate (7-hydrate), and 0.145 g of sodium acetate were added, and preparation of pH 5.0 was carried out by a 1 N sulfuric acid aqueous solution. Then, a deoxidizing treatment was performed through bubbling with a nitrogen gas for 30 min so as to obtain an aqueous solution.

After the temperature of the aqueous solution was raised to 70° C., a mixture including 133.16 g of n-butyl acrylate, and 0.66 g of dodecylmercaptan was deoxidized, and then added at once. Then, 86.74 g of a 0.9% by mass hydrogen peroxide aqueous solution was continuously added at a rate of 2.48 mL/min, and polymerization was performed for 40 min with stirring until the addition was ended.
(Step 2)

To the emulsion obtained in step 1, 107.42 g of a 10% by mass aqueous solution of mercapto group-modified PVA, which was prepared to have pH 5.0 by a 1 N sulfuric acid aqueous solution, and was subjected to a deoxidizing treatment, was added at once. Subsequently, a mixture including 133.16 g of n-butyl acrylate, and 0.66 g of dodecylmercaptan was deoxidized, and was added at once. Then, 86.74 g of a 0.9% by mass hydrogen peroxide aqueous solution was continuously added at a rate of 2.48 mL/min, and polymerization was performed for 40 min with stirring until the addition was ended.
(Step 3)

The same operation as that in step 2 was performed except that the emulsion obtained in step 2 was used.
(Step 4)

The same operation as that in step 3 was performed except that the emulsion obtained in step 3 was used. Then, after stirring for 4 h, at a point in time when it was confirmed that the total monomer conversion rate exceeded 99.5%, the polymerization tank was cooled to 25° C., and an emulsion of polymer fine particles (BA/mercapto group-modified PVA particles) was taken out. The average particle size in the emulsion was 306.3 nm, and the solid content concentration was 33% by mass.

Example 1

12 g of MA-PVA105 (2.0) was added to 88 mL of ion exchanged water and was dissolved through stirring at 80° C. for 4 h. After cooling to a room temperature, to the MA-PVA105 (2.0) aqueous solution, L0290 as a water-soluble photo-radical polymerization initiator was added up to 0.1% by mass and was dissolved, and an uncured gel solution was prepared.

Next, hydrogel particles were produced by an orthogonal flow type capillary device (continuous phase tube: PTFE tube (inner diameter 1/16 inch, and outer diameter 1/8 inch), disperse phase tube: 21 G injection needle) manufactured with reference to Journal of the American Chemical Society (2005, Vol 127, p. 10498-10499).

Castor oil as a continuous phase and the uncured gel solution as a disperse phase were sent at 0.45 mL/min, and 0.05 mL/min, respectively by a syringe pump so that micro-droplets were formed and flowed through the PTFE tube while irradiation of UV light was performed for 4 min by a UV Curing Unit S2 manufactured by DWS. The obtained hydrogel particles were separated through filtration, and washed with acetone so as to remove excess castor oil. Then, through swelling in ion exchanged water, hydrogel particles were obtained.

In regard to the obtained hydrogel particles, the average particle size (volume-based average particle size), the coefficient of variation of a particle size distribution (Cv value), the solvent content of the hydrogel particles, the filterability and the tensile breaking strength of gel were measured according to a method to be described below, and the degree of gel disintegration and the surface smoothness were evaluated. The results are noted in Table 2.

Example 2

Hydrogel particles were obtained in the same manner as in Example 1 except that MA-PVA205 (2.0) was used instead of MA-PVA105 (2.0) in Example 1.

In regard to the obtained hydrogel particles, the average particle size (volume-based average particle size), the coefficient of variation of a particle size distribution (Cv value), the solvent content of the hydrogel particles, the filterability and the tensile breaking strength of gel were measured according to a method to be described below, and the degree of gel disintegration and the surface smoothness were evaluated. The results are noted in Table 2.

Example 3

8 g of MA-PVA117 (2.0) was added to 92 mL of ion exchanged water and was dissolved through stirring at 80° C. for 4 h. After cooling to a room temperature, to the MA-PVA117 (2.0) aqueous solution, L0290 as a water-soluble photo-radical polymerization initiator was added up to 0.1% by mass and was dissolved, and an uncured gel solution was prepared. Hydrogel particles were obtained in the same manner as in Example 1 except that the uncured gel solution was used while being kept warm at 50° C.

In regard to the obtained hydrogel particles, the average particle size (volume-based average particle size), the coefficient of variation of a particle size distribution (Cv value), the solvent content of the hydrogel particles, the filterability and the tensile breaking strength of gel were measured according to a method to be described below, and the degree of gel disintegration and the surface smoothness were evaluated. The results are noted in Table 2.

Example 4

20 g of MA-PVA105 (2.0) was added to 80 mL of ion exchanged water and was dissolved through stirring at 80° C. for 10 h. To 15 g of the MA-PVA105 (2.0) solution, 0.9 g (solid content 0.3 g) of the emulsion of BA/mercapto group-modified PVA particles (solid content concentration: 33% by mass) of Synthesis Example A and 14.1 g of ion exchanged water were added and were stirred. After cooling to a room temperature, to the MA-PVA aqueous solution, L0290 as a water-soluble photo-radical polymerization initiator was added up to 0.1% by mass and was dissolved, and an uncured gel solution was prepared. By using the uncured gel solution, hydrogel particles were obtained in the same manner as in Example 1.

In regard to the obtained hydrogel particles, the average particle size (volume-based average particle size), the coefficient of variation of a particle size distribution (Cv value), the solvent content of the hydrogel particles, the filterability, and the tensile breaking strength of gel were measured according to a method to be described below and the degree of gel disintegration and the surface smoothness were evaluated. The results are noted in Table 2.

Example 5

12 g of MA-PVA105 (2.0) was added to 88 mL of ion exchanged water and was dissolved through stirring at 80° C. for 4 h. After cooling to a room temperature, to the MA-PVA105 (2.0) aqueous solution, 1 g of sodium alginate (NSPLLR) was added and was stirred at a room temperature for 3 h. L0290 as a water-soluble photo-radical polymerization initiator was added up to 0.1% by mass and was dissolved to prepare an uncured gel solution. By using the uncured gel solution, hydrogel particles were obtained in the same manner as in Example 1.

The obtained hydrogel particles were immersed in a calcium chloride aqueous solution (1 g of calcium chloride/100 mL of water) for 30 min, to obtain hydrogel particles composed of mutual penetration type gel.

In regard to the obtained hydrogel particles, the average particle size (volume-based average particle size), the coefficient of variation of a particle size distribution (Cv value), the solvent content of the hydrogel particles, the filterability, and the tensile breaking strength of gel were measured according to a method to be described below, and the degree of gel disintegration and the surface smoothness were evaluated. The results are noted in Table 2.

Example 6

By using the uncured gel solution produced in Example 1, hydrogel particles were produced as follows. An orthogonal flow type capillary device (continuous phase tube: PTFE tube (inner diameter 1/16 inch, and outer diameter 1/8 inch), disperse phase tube: 30 G injection needle) was used to produce the hydrogel particles. Castor oil as a continuous phase and the uncured gel solution as a disperse phase were sent at 3 mL/min and 0.05 mL/min, respectively by a syringe pump, so that microdroplets were formed and collected in a beaker, which were immediately followed by irradiation of UV light by a UV Curing Unit S2 manufactured by DWS for 4 min. The obtained hydrogel particles were separated through filtration, and washed with acetone so as to remove excess castor oil. Then, through swelling in ion exchanged water, hydrogel particles were obtained.

In regard to the obtained hydrogel particles, the average particle size (volume-based average particle size), the coefficient of variation of a particle size distribution (Cv value), the solvent content of the hydrogel particles, the filterability and the tensile breaking strength of gel were measured according to a method to be described below, and the degree of gel disintegration and the surface smoothness were evaluated. The results are noted in Table 2.

Example 7

12 g of Nor-PVA105 (1.3) was added to 88 mL of ion exchanged water and was dissolved through stirring at 80° C. for 4 h. After cooling to a room temperature, to the Nor-PVA105 (1.3) aqueous solution, 0.34 g of 3,6-dioxa-1,8-octanedithiol as polythiol was added and stirred. To this solution, L0290 as a water-soluble photo-radical polymerization initiator was added up to 0.1% by mass and was dissolved, and an uncured gel solution was prepared. By using the uncured gel solution, hydrogel particles were obtained in the same manner as in Example 1.

In regard to the obtained hydrogel particles, the average particle size (volume-based average particle size), the coefficient of variation of a particle size distribution (Cv value), the solvent content of the hydrogel particles, the filterability and the tensile breaking strength of gel were measured according to a method to be described below, and the degree of gel disintegration and the surface smoothness were evaluated. The results are noted in Table 2.

Example 8

10 g of hydrogel particles obtained in Example 1 was immersed in 200 mL of acetone for 1 h. An operation of removing acetone through decantation was repeated 3 times. Acetone-substituted hydrogel particles were dried under reduced pressure overnight. A solution containing 0.5 g (3.1 mmol) of 1,1-carbonyldiimidazole dissolved in 9 g of acetonitrile was added to the obtained dried gel particles, and was shaken at 40° C. for 4 h. The hydrogel particles were filtered, and were immersed in 50 mL of acetone for 10 min and then acetone was removed through decantation. This washing operation with acetone was repeated 4 times, and the activated hydrogel particles were vacuum-dried overnight.

A solution containing 75 mg of gelatin as a physiologically active substance dissolved in 13 mL of phosphate buffer was added to the activated hydrogel particles, and was shaken at a room temperature for 12 h so that the gelatin is reacted with the hydrogel particles through covalent bonding. After the reaction, the hydrogel particles were filtered, and were immersed in 25 mL of phosphate buffer for 1 h. The phosphate buffer was removed through decantation, and immersion in 25 mL of phosphate buffer was performed again. This was repeated 3 times so as to obtain hydrogel particles in which the physiologically active substance was immobilized through covalent bonding.

The amount of immobilized gelatin was measured by a Bicinchoninic acid (BCA) method (BCA Protein Assay Kit (manufactured by Takara Bio Inc)) and was found to be 1.7 mg/hydrogel particles (phosphate buffer swollen product).

In regard to the obtained hydrogel particles, the average particle size (volume-based average particle size), the coefficient of variation of a particle size distribution (Cv value), the solvent content of the hydrogel particles, the filterability, and the tensile breaking strength of gel were measured according to a method to be described below, and the degree of gel disintegration and the surface smoothness were evaluated. The results are noted in Table 2.

Comparative Example 1

12 g of MA-PVA105 (2.0) was added to 88 mL of ion exchanged water and was dissolved through stirring at 80° C. for 4 h. After cooling to a room temperature, 0.1 g of sodium persulfate was dissolved in the MA-PVA105 (2.0) aqueous solution to prepare an uncured gel solution.

Next, 50 mL of liquid paraffin was put in a separable flask (a round-bottomed separable flask) equipped with a 100 mL dimroth condenser, and 0.02 g of sodium sulfosuccinate dioctyl was dissolved. To this, 6.5 mL of the uncured gel solution was added and stirred by using stirring blades (half-moon type) at 400 rpm. To this, 50 μL of N,N,N',N'-tetramethylethylenediamine was added, and gelling was carried out at 55° C. for 3 h. The obtained particles were separated through filtration, and were washed with ether so as to remove excess liquid paraffin. Then, through swelling in ion exchanged water, hydrogel particles were obtained.

In regard to the obtained hydrogel particles, the average particle size (volume-based average particle size), the coefficient of variation of a particle size distribution (Cv value), the solvent content of the hydrogel particles, the filterability, and the tensile breaking strength of gel were measured according to a method to be described below, and the degree of gel disintegration and the surface smoothness were evaluated. The results are noted in Table 2.

Comparative Example 2

Hydrogel particles were obtained in the same manner as in Example 1 except that MA-PVA103 (2.0) was used instead of MA-PVA105 (2.0) in Example 1.

In regard to the obtained hydrogel particles, the average particle size (volume-based average particle size), the coefficient of variation of a particle size distribution (Cv value), the solvent content of the hydrogel particles, the filterability, and the tensile breaking strength of gel were measured according to a method to be described below, and the results are noted in Table 2.

Evaluations on Examples and Comparative Examples were performed according to the method to be described below.

[Evaluation Method of Hydrogel Particles Obtained in Examples and Comparative Examples]

<Average Particle Size and Coefficient of Variation of Particle Size Distribution (Cv Value) of Hydrogel Particles>

On a mixed solution containing water dispersion (0.1 mL) of the hydrogel particles of Examples 1 to 8 and Comparative Examples 1 and 2 and ion exchanged water (10 mL), the average particle size and the coefficient of variation of a particle size distribution (Cv value; logarithmic scale) of the particles were measured on a volume basis by using a laser diffraction/scattering type particle size distribution measuring device (device name: partica LA-950, manufactured by HORIBA Ltd.).

<Content of Solvent in Hydrogel Particles>

The obtained hydrogel particles were subjected to substitution with a large excess of ion exchanged water, and then were separated through filtration to remove moisture on the particle surface. After the weight ($W_{wet}$) was measured, the obtained hydrogel particles were put in a hot air dryer of 120° C. and were dried for 3 h. The weight ($W_{dry}$) of the dried hydrogel particles was measured and the amount of solvent in the hydrogel particles was measured by the following formula.

Solvent Content (%)=$(W_{wet}-W_{dry})/W_{wet}\times 100$

<Evaluation of Tensile Breaking Strength of Hydrogel>

The tensile strength of hydrogel constituting hydrogel particles of Examples and Comparative Examples was measured by the following procedure. The uncured gel solution produced in Examples 1 to 8 and Comparative Examples 1 and 2 was poured between glass plates between which a 1 mm-thickness spacer was placed. Irradiation was performed on the uncured gel solution in Examples 1 to 8 and Comparative Example 2 by a UV Curing Unit S2 manufactured by DWS for 4 min. In addition, the uncured gel solution of Comparative Example 1 was subjected to a reaction at 70° C. for 3 h. Gel with a thickness of 1 mm was taken out, and a test piece was cut out by using a dumbbell cutter of a standard JISK-6251-3 according to a method described in Japanese Patent Laid-Open Publication No. 2015-004059. Two mark points were attached to the test piece by using a correction fluid, and a distance between the mark points was measured by a vernier caliper. The width and the thickness of the test piece were measured by using a micrometer. The test piece was set in a tensile tester (5566 type) manufactured by Eastone, and a breaking stress and a breaking strain were measured while image data was acquired. In this evaluation, the larger the numerical value, the higher the mechanical strength of the hydrogel particles.

<Evaluation of Degree of Disintegration of Hydrogel>

The degree of disintegration of hydrogel constituting hydrogel particles of Examples and Comparative Examples was measured by the following procedure. The uncured gel solution produced in Examples 1 to 8 and Comparative Examples 1 and 2 was poured between glass plates between which a 1 mm-thickness spacer was placed. Irradiation was performed on the uncured gel solution in Examples 1 to 8 and Comparative Example 2 by a UV Curing Unit S2 manufactured by DWS for 4 min. In addition, the uncured gel solution of Comparative Example 1 was subjected to a reaction at 70° C. for 3 h. Gel with a thickness of 1 mm was taken out, and a sliced piece of 6×6 mm (thickness 1 mm) was prepared. Into a 50 mL sample bottle, 10 sliced pieces were put together with 3 mL of ion exchanged water, and a stirrer having a length of 2.5 cm was put. Stirring was performed with the magnetic stirrer at 800 rev/min for 3 h, and the ratio (%) of sliced pieces keeping original shapes (6×6 mm (thickness 1 mm)) among 10 sliced pieces was measured. In this evaluation, the smaller the numerical value, the higher the mechanical strength of the hydrogel particles.

<Evaluation of Surface Smoothness of Hydrogel Particles>

The surface smoothness of hydrogel particles in Examples and Comparative Examples was measured by the following procedure. In regard to the hydrogel particles produced in Examples 1 to 8 and Comparative Examples 1 and 2, the particles were visually observed by an optical microscope (Observer.A1 manufactured by ZEISS) to evaluate whether there were particles having a surface roughness (non-smooth particles having wrinkles on the surfaces). When a large amount of particles having a surface roughness is included, the surface smoothness was set to B, and when particles having a surface roughness are hardly included, A was set.

<Evaluation of Filterability>

Sieving was carried out with sieves with a mesh opening of 425 μm (36 mesh) for Examples 1 to 5, and 7 to 8 and Comparative Example 2 and a mesh opening of 250 μm (60 mesh) for Example 6 and Comparative Example 1, and the weight of hydrogel particles that passed through the sieve was measured. The % by mass of the hydrogel particles that passed through the sieve was calculated. In this evaluation, the smaller the numerical value, the higher the filterability.

TABLE 2

|  |  |  | Examples | | | | |
|---|---|---|---|---|---|---|---|
|  |  |  | 1 | 2 | 3 | 4 | 5 |
| Blending (mass %) of uncured gel solution | Vinyl alcohol-based polymer | MA-PVA105(2.0) [polymerization degree = 500] | 12.00 |  |  | 10.00 | 11.90 |
|  |  | MA-PVA205(2.0) [polymerization degree = 500] |  | 12.00 |  |  |  |
|  |  | MA-PVA117(2.0) [polymerization degree = 1700] |  |  | 8.00 |  |  |
|  |  | Nor-PVA105(1.3) [polymerization degree = 500] |  |  |  |  |  |

TABLE 2-continued

|  |  |  |  |  |  |  |  |
|---|---|---|---|---|---|---|---|
|  | Comparative polymer | MA-PVA103(2.0) [polymerization degree = 300] |  |  |  |  |  |
|  | Polymer fine particles | BA/mercapto group-modified PVA particles |  |  |  | 1.00 |  |
|  | Carboxy group-containing water-soluble polymer | Sodium alginate |  |  |  |  | 1.00 |
|  | Polythiol | 3,6-dioxa-1,8-octanedithiol |  |  |  |  |  |
|  | Radical polymerization initiator | L0290 | 0.10 | 0.10 | 0.10 | 0.10 | 0.10 |
|  |  | Sodium persulfate |  |  |  |  |  |
|  | Solvent | Ion-exchanged water | rest | rest | rest | rest | rest |
| Physiologically active substance Evaluation |  | Gelatin |  |  | not used |  |  |
|  |  | Average particle size (μm) [volume basis] | 816 | 801 | 812 | 798 | 808 |
|  |  | Coefficient (%) of variation of particle size distribution [Cv value] | 4.3 | 3.5 | 3.9 | 3.4 | 4.1 |
|  |  | Content (mass %) of solvent in hydrogel particles | 84 | 86 | 89 | 79 | 82 |
|  |  | Tensile breaking strength (MPa) of gel | 0.163 | 0.152 | 0.101 | 0.308 | 0.219 |
|  |  | Degree of disintegration (%) of gel | 0 | 0 | 0 | 0 | 0 |
|  |  | Particle surface smoothness | A | A | A | A | A |
|  |  | Filterability (mass %) | 0 | 0 | 0 | 0 | 0 |

|  |  |  | Examples | | | Comparative Examples | |
|---|---|---|---|---|---|---|---|
|  |  |  | 6 | 7 | 8 | 1 | 2 |
| Blending (mass %) of uncured gel solution | Vinyl alcohol-based polymer | MA-PVA105(2.0) [polymerization degree = 500] | 12.00 |  | 12.00 | 12.00 |  |
|  |  | MA-PVA205(2.0) [polymerization degree = 500] |  |  |  |  |  |
|  |  | MA-PVA117(2.0) [polymerization degree = 1700] |  |  |  |  |  |
|  |  | Nor-PVA105(1.3) [polymerization degree = 500] |  | 12.00 |  |  |  |
|  | Comparative polymer | MA-PVA103(2.0) [polymerization degree = 300] |  |  |  |  | 12.00 |
|  | Polymer fine particles | BA/mercapto group-modified PVA particles |  |  |  |  |  |
|  | Carboxy group-containing water-soluble polymer | Sodium alginate |  |  |  |  |  |
|  | Polythiol | 3,6-dioxa-1,8-octanedithiol |  | 0.34 |  |  |  |
|  | Radical polymerization initiator | L0290 | 0.10 | 0.10 | 0.10 |  | 0.10 |
|  |  | Sodium persulfate |  |  |  | 0.10 |  |
|  | Solvent | Ion-exchanged water | rest | rest | rest | rest | rest |
| Physiologically active substance Evaluation |  | Gelatin | not used | not used | used | not used | not used |
|  |  | Average particle size (μm) [volume basis] | 365 | 811 | 816 | 342 | 805 |
|  |  | Coefficient (%) of variation of particle size distribution [Cv value] | 1.8 | 3.3 | 4.3 | 13.0 | 4.1 |
|  |  | Content (mass %) of solvent in hydrogel particles | 84 | 87 | 84 | 84 | 85 |
|  |  | Tensile breaking strength (MPa) of gel | 0.159 | 0.193 | 0.142 | 0.163 | 0.005 |
|  |  | Degree of disintegration (%) of gel | 0 | 0 | 0 | 0 | 90 |
|  |  | Particle surface smoothness | A | A | A | A | B |
|  |  | Filterability (mass %) | 0 | 0 | 0 | 21 | 0 |

As is clear from the results of Examples 1 to 8, and Comparative Examples 1 and 2, it can be found that according to the present invention, it is possible to obtain monodisperse hydrogel particles having a high mechanical strength and a narrow particle size distribution.

INDUSTRIAL APPLICABILITY

The hydrogel particles of the present invention have a very small particle size distribution, and a high mechanical strength. Thus, its suitable use is possible in various fields such as an adsorption carrier of metal ions; an enzyme immobilization carrier; a drug delivery carrier; an affinity carrier; an encapsulation carrier of cells or microorganisms; particles for vascular embolization; and a carrier for drainage treatment.

The invention claimed is:
1. Monodisperse hydrogel particles comprising
a cross-linked product of a vinyl alcohol-based polymer having
an ethylenically unsaturated group bonded to a backbone of a vinyl alcohol-based polymer directly through an ester bond, and
an average degree of polymerization of 450 or more, the monodisperse hydrogel particles having
an average particle size of 10 to 5,000 μm, and
a coefficient of variation of a particle size distribution of 10% or less;
wherein the ethylenically unsaturated group is a radically polymerizable group capable of forming a cross-link between vinyl alcohol-based polymer chains by an active energy ray, heat, or a redox-based polymerization initiator.

2. The monodisperse hydrogel particles according to claim 1, wherein the cross-linked product of the vinyl alcohol-based polymer has a tensile breaking strength of 0.05 MPa or more.

3. The monodisperse hydrogel particles according to claim 1, wherein the ethylenically unsaturated group is at least one selected from the group consisting of a vinyl group, a (meth)acryloyloxy group, a vinylphenyl group, a norbornenyl group and derivatives thereof.

4. The monodisperse hydrogel particles according to claim 1, wherein the hydrogel particles contain a solvent of 5 to 99% by mass.

5. The monodisperse hydrogel particles according to claim 1, wherein an introduction rate of the ethylenically unsaturated group is 0.01 to 10 mol % relative to all structural units constituting the vinyl alcohol-based polymer.

6. A composite of
the monodisperse hydrogel particles according to claim 1, and
a physiologically active substance or an enzyme.

7. The composite according to claim 6, wherein the monodisperse hydrogel particles are covalently bonded to the physiologically active substance or the enzyme.

8. A composite in which monodisperse hydrogel particles are covalently bonded to a physiologically active substance or an enzyme,
wherein the covalent bond is formed by a reaction between a hydroxyl group of a vinyl alcohol polymer and a functional group of the physiologically active substance or the enzyme,
wherein the monodisperse hydrogel particles contains a cross-linked product of a vinyl alcohol-based polymer having an ethylenically unsaturated group and an average degree of polymerization of 450 or more, in which
an average particle size is 10 to 5,000 μm, and
a coefficient of variation of a particle size distribution of 10% or less.

9. The composite according to claim 8, wherein the functional group of the physiologically active substance or the enzyme is an amino group.

10. The composite according to claim 8, wherein the cross-linked product has a tensile breaking strength of 0.05 MPa or more.

11. The composite according to claim 8, wherein the ethylenically unsaturated group is at least one selected from the group consisting of a vinyl group, a (meth)acryloyloxy group, a (meth)acryloylamino group, a vinylphenyl group, a norbornenyl group and derivatives thereof.

12. The composite according to claim 8, wherein the hydrogel particles contain a solvent of 5 to 99% by mass.

13. The composite according to claim 8, wherein an introduction rate of the ethylenically unsaturated group is 0.01 to 10 mol % relative to all structural units constituting the vinyl alcohol-based polymer.

* * * * *